(12) United States Patent
Friedman

(10) Patent No.: US 11,315,182 B2
(45) Date of Patent: *Apr. 26, 2022

(54) VALIDATION ENGINE WITH DUAL PROCESSING CAPACITY

(71) Applicant: Seth Gregory Friedman, Tokyo (JP)

(72) Inventor: Seth Gregory Friedman, Tokyo (JP)

( * ) Notice: Subject to any disclaimer, the term of this patent is extended or adjusted under 35 U.S.C. 154(b) by 538 days.

This patent is subject to a terminal disclaimer.

(21) Appl. No.: 16/297,136

(22) Filed: Mar. 8, 2019

(65) Prior Publication Data

US 2019/0205986 A1    Jul. 4, 2019

Related U.S. Application Data

(63) Continuation of application No. 15/331,110, filed on Oct. 21, 2016, now Pat. No. 10,269,071, which is a continuation of application No. 13/663,465, filed on Oct. 29, 2012, now Pat. No. 9,501,795, which is a continuation of application No. 13/216,161, filed on Aug. 23, 2011, now abandoned.

(60) Provisional application No. 61/376,162, filed on Aug. 23, 2010.

(51) Int. Cl.
*G06Q 40/04* (2012.01)
*G06Q 40/06* (2012.01)

(52) U.S. Cl.
CPC ............ *G06Q 40/04* (2013.01); *G06Q 40/06* (2013.01)

(58) Field of Classification Search
None
See application file for complete search history.

(56) References Cited

U.S. PATENT DOCUMENTS

| 5,926,473 A | 7/1999 | Gridley |
| 6,327,242 B1 | 12/2001 | Amicangioli et al. |
| 6,522,656 B1 | 2/2003 | Gridley |
| 6,535,509 B2 | 3/2003 | Amicangioli et al. |
| 7,224,669 B2 | 5/2007 | Kagan et al. |

(Continued)

OTHER PUBLICATIONS

Agarwal et al., "Faster FAST: Multicore Acceleration of Streaming Financial Data," Computer Science Research and Development, May 2009, 11 pages, vol. 23.

(Continued)

*Primary Examiner* — Jessica Lemieux
(74) *Attorney, Agent, or Firm* — McDonnell Boehnen Hulbert & Berghoff LLP

(57) ABSTRACT

Methods and systems for performing risk checks on electronic orders for securities. According to one embodiment, the method comprises performing risk checks on an electronic order for a security, the electronic order being issued from a client computer to an exchange computer via a network, wherein a risk check engine is logically interposed between the client computer and the exchange computer on the network. According to the illustrative method, at the risk check engine, the electronic order is received and parsed into one or more fields and data within the fields is identified at a network layer. The risk check engine performs one or more risk checks on the data using a processing element at the network layer. If the risk checks are passed, the risk check engine permits the electronic order to be transmitted to the exchange computer. If one or more of the risk checks are violated, the risk check engine rejects the order.

20 Claims, 13 Drawing Sheets

(56) References Cited

U.S. PATENT DOCUMENTS

| | | | |
|---|---|---|---|
| 7,230,947 B1 | 6/2007 | Huber et al. | |
| 7,636,703 B2 | 12/2009 | Taylor | |
| 7,640,208 B2 | 12/2009 | Grossman | |
| 7,640,298 B2 | 12/2009 | Berg | |
| 7,680,718 B2 | 3/2010 | Brandes et al. | |
| 7,707,098 B2* | 4/2010 | West | G06Q 40/00 |
| | | | 705/37 |
| 7,827,087 B2 | 11/2010 | Adatia et al. | |
| 7,840,481 B2 | 11/2010 | Aloe et al. | |
| 7,873,560 B2 | 1/2011 | Reich et al. | |
| 7,921,046 B2 | 4/2011 | Parsons et al. | |
| 8,014,274 B1 | 9/2011 | Amicangioli et al. | |
| 8,296,221 B1 | 10/2012 | Waelbroeck et al. | |
| 8,751,364 B2 | 6/2014 | Gaber et al. | |
| 2002/0156721 A1 | 10/2002 | Lyback et al. | |
| 2004/0236888 A1 | 11/2004 | Dieffenderier et al. | |
| 2008/0243675 A1 | 10/2008 | Parsons et al. | |
| 2009/0157452 A1 | 6/2009 | Arora et al. | |
| 2010/0082474 A1 | 4/2010 | Beaumont | |
| 2010/0094743 A1 | 4/2010 | Robertson et al. | |
| 2010/0095277 A1 | 4/2010 | Cheng et al. | |
| 2010/0174770 A1 | 7/2010 | Pandya | |
| 2011/0016221 A1 | 1/2011 | Amicangioli et al. | |
| 2012/0130919 A1 | 5/2012 | Gaber | |
| 2012/0166327 A1 | 6/2012 | Amicangioli | |

OTHER PUBLICATIONS

Declaration of Inventor Under 37 CFR 1.132—Seth Gregory Friedman, filed Jan. 13, 2014 in U.S. Appl. No. 13/633,465, 526 pages (submitted as parts 1 and 2).

Final Office Action dated Nov. 13, 2013, issued in connection with U.S. Appl. No. 13/216,161, 15 pages.

GE FANUC Intelligent Platforms, "WANic 5860 Packet Processors: Intelligent High-Performance 4-Port Gigabit Ethernet Packet Processor PCI-X Card," Copyright 2008, 2 pages.

Leber et al., "High Frequency Trading Acceleration Using FPGAs," 2011 International Conference on Field Programmable Logic and Applications (FPL), Sep. 2011, 6 pagese.

Lockwood et al., "NetFPGA—An Open Platform for Gigabit-rate Network Switching and Routing," IEEE International Conference on Microelectronic Systems Education, Jun. 2007, 2 pages.

Moallemi et al., "The Cost of Latency," Jul. 19, 2011, 49 pages.

Morris et al., "FPGA Accelerated Low-Latency Market Data Feed Processing," 17th IEEE Symposium on High Performance Interconnects, 2009, 7 pages.

Nomura Holdings, Inc., "Nomura Launches Ultra-Low Latency NXT Product Suite in the US," News Release, [online], Nov. 9, 2010. Retrieved from the Internet at <URL: http://www.nomuraholdings.com/news/nr/americas/20101109/20101109.html>, 2 pages.

Non-Final Office Action dated Feb. 6, 2013, issued in connection with U.S. Appl. No. 13/216,161, 9 pages.

Response to Non-Final Office Action filed on Aug. 2, 2013, in connection with U.S. Appl. No. 13/216,161, 11 pages.

Response to Restriction Requirement and Preliminary Amendment filed on Oct. 23, 2012, in connection with U.S. Appl. No. 13/216,161, 11 pages.

Restriction Requirement dated Aug. 23, 2013, issued in connection with U.S. Appl. No. 13/216,161, 3 pages.

Sadoghi et al., "Efficient Event Processing Through Reconfigurable Hardware for Algorithmic Trading," Proceedings of the VLDB Endowment, 2010, 4 pages, vol. 3, No. 2.

The Tabb Group, LLC, "The Value of a Millisecond: Finding the Optimal Speed of a Trading Infrastructure," Copyright 2008, 17 pages.

Cut-Through and Store-and-Forward Ethernet Switching for Low-Latency Environments, Cisco Systems, Inc., 2008.

Kermani and Kleinrock, Virtual Cut-Through: A New Computer Communication Switching Technique, North-Holland Publishing Company. Computer Networks 3,1979, pp. 267-286.

Haas, The IEEE 1355 Standard: Developments, Performance and Application in High Energy Physics, Doctoral Thesis, University of Liverpool, Dec. 1998.

\* cited by examiner

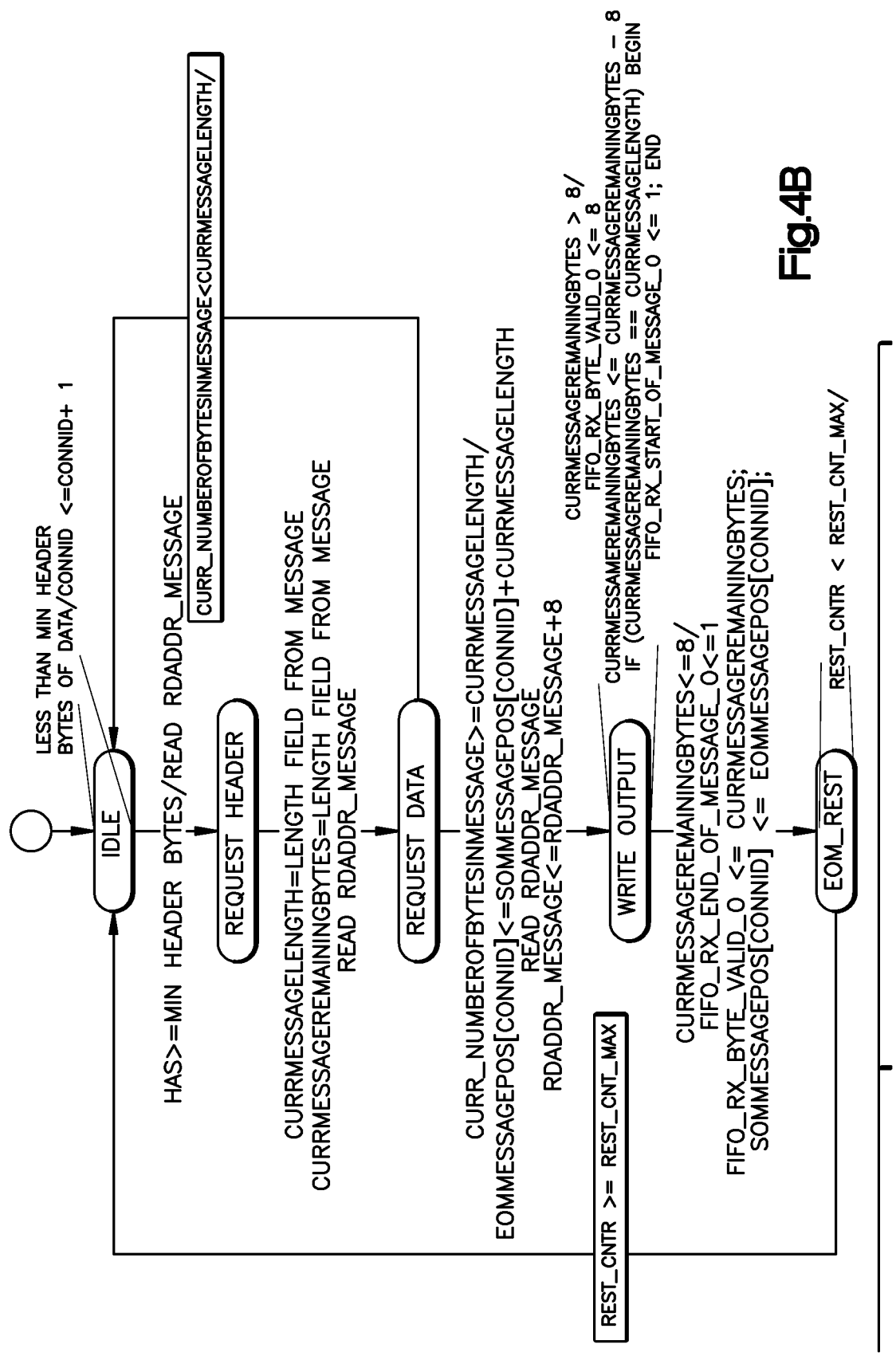

VALIDATION ENGINE WITH DUAL PROCESSING CAPACITY

CROSS-REFERENCE TO RELATED APPLICATIONS

This application is a continuation of and claims priority to U.S. patent application Ser. No. 15/331,110, filed Oct. 21, 2016, which is hereby incorporated by reference in its entirety. U.S. patent application Ser. No. 15/331,110 is a continuation of and claims priority to U.S. patent application Ser. No. 13/663,465, filed Oct. 29, 2012, which is hereby incorporated by reference in its entirety. U.S. patent application Ser. No. 13/663,465 is a continuation of and claims priority to U.S. patent application Ser. No. 13/216,161, filed Aug. 23, 2011, which is hereby incorporated by reference in its entirety. U.S. patent application Ser. No. 13/216,161 claims priority to U.S. provisional patent application No. 61/376,162, filed Aug. 23, 2010, which is hereby incorporated by reference in its entirety.

BACKGROUND

Field of the Invention

The present invention relates to a methods and systems for performing analysis, such as risk and regulatory checks, on electronic market orders for securities, and more specifically methods and systems for the implementation of a risk management platform and the performance of risk/regulatory checks.

Description of Related Art

In the financial industry, it has been common practice since about 1995 for institutional investors to access financial exchanges for order placement via electronic/computerized order management, routing and trading systems. Initially, these systems replaced traditional client/broker communication methods such as phone and electronic mail or other electronic messaging systems, such as those operated by Bloomberg or Reuters, while the broker maintained their traditional role of conducting order management (i.e., the placement of orders to an exchange).

However, beginning in the late 1990's, a fundamental evolution began to reshape the traditional methods of order placement and order management with the introduction of direct market access (or DMA). DMA allows institutional investors to place orders electronically, directly to a financial exchange, passing-through or bypassing the order management infrastructure of their broker.

As the financial markets continued to evolve, and DMA took on greater importance, the dependency on technology to deliver a competitive edge—particularly, by realizing increased order message throughput and lower latency— gained increasing importance. Achieving a competitive edge by achieving greater order message throughput and lower latency in exchange venue access became a principal concern for institutional investors.

Given the importance and benefits of quickly and efficiently routing orders to an exchange for execution, the DMA model evolved to include so-called "naked" access and "sponsored" access to exchanges—methodologies where institutional investors access financial markets directly, using their internal order management systems (OMS's) without transiting the order management infrastructure of their broker. With naked access and sponsored access, brokers were no longer able to conduct regulatory required pre-trade real-time risk management checks of order flow. Due to perceived danger to the markets in permitting institutional investors to utilize naked access and sponsored access, regulatory bodies, in particular, U.S.-based regulators, moved to end the practice of bypassing a broker's order management infrastructure, and have implemented regulations which require brokers, in all but a few circumstances, to conduct pre-trade real-time risk management checks of a client's order flow.

By way of example, Rule 15c3-5 under the Securities Exchange Act of 1934 requires a myriad of risk checks, regulatory checks and other order management analyses on the order message prior to permitting the order message to be routed to an exchange system. More specifically, as quoted from SEC Release No. 34-63241:

Rule 15c3-5 will require brokers or dealers with access to trading securities directly on an exchange or alternative trading system ("ATS"), including those providing sponsored or direct market access to customers or other persons, and broker-dealer operators of an ATS that provide access to trading securities directly on their ATS to a person other than a broker or dealer, to establish, document, and maintain a system of risk management controls and supervisory procedures that, among other things, are reasonably designed to (1) systematically limit the financial exposure of the broker or dealer that could arise as a result of market access, and (2) ensure compliance with all regulatory requirements that are applicable in connection with market access.

It will also be recognized that such systems that perform primary market/regulatory risk management checks may also be utilized by broker-dealers or other persons or entities with market access to perform checks on their internal exchange-bound orders. Thus, systems that perform primary market/regulatory risk management checks should not be understood in the context of the present application as being limited only to systems that perform checks on a customer's or other third party's orders.

One technological problem with the implementation of a system that performs such primary market/regulatory risk management checks is that such systems may introduce latency into the transmission of orders from the customer's OMS, through the risk check system and on to the exchange. Such latency is believed to be on the order of about 180 milliseconds. Although such latency in having the order routed to the exchange is typically measured in just milliseconds, it can introduce undesired exposure to market movements.

Thus, there is a need in the field for systems and methods that perform desired or required primary market/regulatory risk management checks, while reducing latency in the delivery of order messages to an exchange. Furthermore, because any latency in delivering an order inherently exposes the order (and the customer issuing it) to market risk, there is a further need in the field for systems and methods that further reduce such latency to ultra-low levels (e.g., to a fraction of a millisecond or the microsecond range).

SUMMARY

Embodiments of the present invention satisfy the foregoing and other needs in the art. For example, a method for providing risk management according to one embodiment comprises performing risk checks on an electronic order for a security, the electronic order being issued from a client computer to an exchange computer via a network, wherein a risk check engine is logically interposed between the client computer and the exchange computer on the network. According to the illustrative method, at the risk check engine, the electronic order is received and parsed into one of more fields and data within the fields is identified at a network layer. The risk check engine performs one or more risk checks on the data using a processing element at the network layer. If the risk checks are passed, the risk check engine permits the electronic order to be transmitted to the exchange computer. If one or more of the risk checks are violated, the risk check engine rejects the order. Illustrative systems for performing such method are also disclosed.

Additional features and advantages of the present invention are described further below. This Summary section is meant merely to illustrate certain features of the invention, and is not meant to limit the scope of the invention in any way. The failure to discuss a specific benefit or feature of the invention, or the inclusion of one or more benefits or features, in this Summary should not be construed to limit the invention as claimed.

BRIEF DESCRIPTION OF THE FIGURES

Embodiments of the invention will be described and shown in detail by way of example with reference to the accompanying drawings in which:

FIG. 4B is a flow diagram illustrating the logic and operation of a message delimiter state machine module of the message delimiter detector of FIG. 4;

DETAILED DESCRIPTION OF EMBODIMENTS

Figure 1:
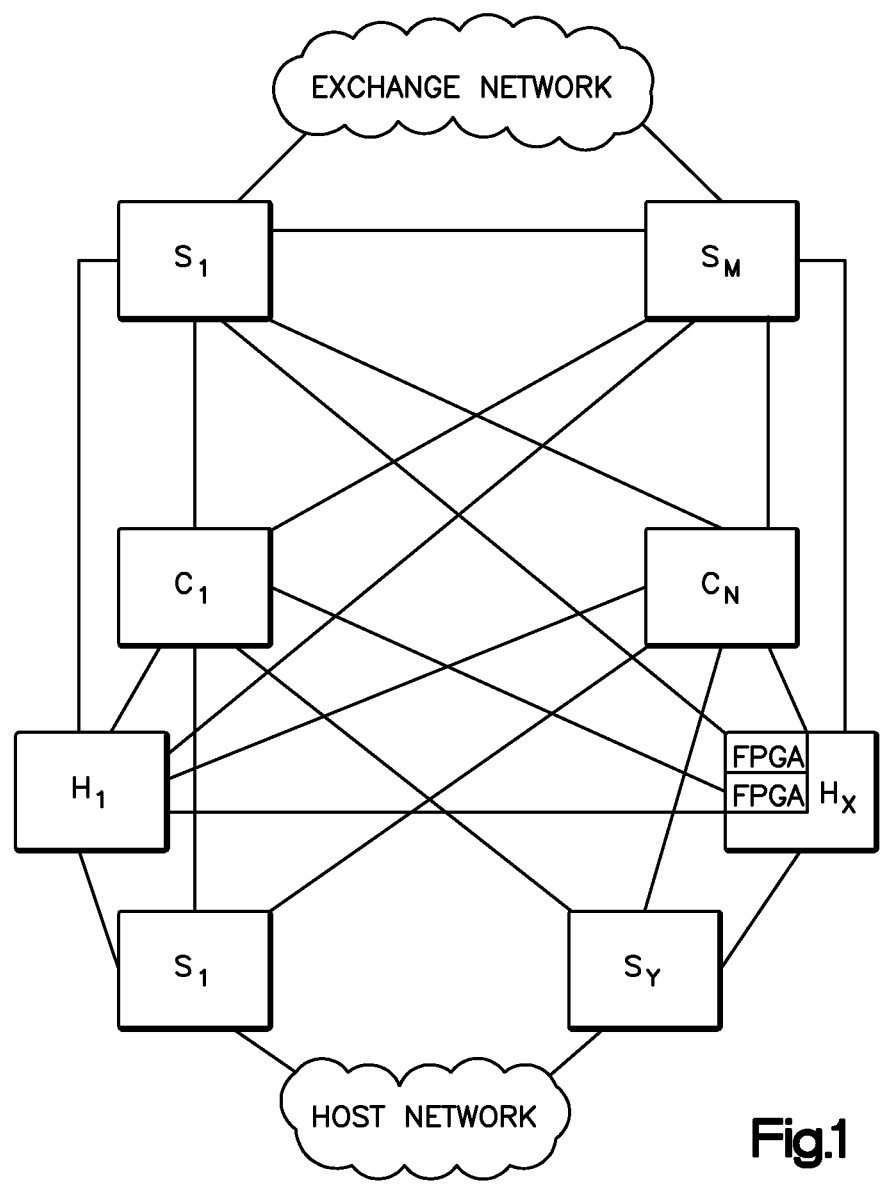
FIG. 1 is a schematic showing certain components according to one embodiment of the present invention.

The systems and methods of the various embodiments described herein represent a novel approach and philosophy for optimizing performance of DMA order flow, while permitting performance of required risk management checks and overcome shortcomings of prior systems. One objective of such systems and methods is to achieve increased performance, e.g., low-latency and high order message throughput, while permitting the applicable regulatory required real-time risk management checks to be performed. This approach is underpinned in the use of advanced technology and technological concepts that broadly have, to this point, not been utilized in a cohesive solution within the financial industry.

In summary, the systems and methods of the various embodiments of the invention recognize that a commercially successful risk management platform should preferably (i.e., but not necessarily) use hardware acceleration techniques to improve mean performance, reduce performance variability, increase capacity and throughput, while also preferably reducing the physical and power requirement footprint and preferably lowering the cost of implementation. Such hardware acceleration techniques preferably may be combined with a novel native protocol network-based risk management technique, as further described below. Such native protocol network-based risk management technique, in a preferred embodiment, overcomes the constraints available using traditional computing concepts associated with moving data from one server to another, or moving data between physical components within a single server, or between different applications or processes within a single server. Such traditional computing concepts can introduce capacity and performance constraints, which may be partially or wholly overcome by utilizing the native protocol network-based risk management technique described herein in the context of the various embodiments.

By way of non-limiting example, the systems and methods of the various embodiments of the invention described herein reduce the processing duplication that occurs in traditional electronic order management infrastructure and reflect a departure from the traditional paradigm of standardized messaging, whether FIX or Custom API. With such systems and methods, a trading strategy can implement the native exchange protocol for messaging, thereby reducing the number of processing steps, including the need for traditional two-way standardized messaging to native exchange protocol translation mechanisms. Such systems and methods may also reduce the duplicative nature of both a client and broker managing real-time state management, validation of tick sizes and lot sizes, symbology lookups and mapping, and a variety of other processing steps.

In certain of the preferred embodiments, primary market/regulatory risk management checks may be implemented via an active risk management real-time network packet decoding and introspection (deep-inspection) technology solution. In certain of such embodiments, secondary market/regulatory and counterparty risk management checks may be implemented in a near real-time passive risk management network packet decoding and introspection (deep-inspection) technology solution. Thus, platform-introduced latency for active risk management may be advantageously reduced from the roughly 180 microseconds of traditional FIX-based platforms to a fraction thereof.

In certain deployment scenarios, the unique business and technical concept of the embodiments of the present invention include, but are not limited to, techniques that permit data to be examined within the network layer in the network protocol (as defined by a particular exchange or financial market). Accordingly, such embodiments seek to bring the processing functionality of the application closer to the data that needs to be examined—a significant departure from traditional technology solutions in which the relevant data is received from the client, removed from the network, passed up through a series of physical and software-based components and layers, delivered to an application programmed to perform the regulatory checks (e.g., at the application network layer), and then passed down through the series of physical and software-based components and layers on the outbound-side before being returned to the network layer for transmission to the exchange. Such techniques, in contrast to certain embodiments described herein, introduce unwanted latency into the order message checking process and, thus, to the transmission of the order to the exchange and execution of the order.

According to certain embodiments, a risk management system comprises a printed circuit board (PCB) communicatively connected, on an input side, to a client system configured to generate an order message and, on an output side, to an exchange system configured to receive the order message and execute a trade based on the order message, wherein the PCB includes programming operative to perform one or more checks on the order message and make a determination whether to reject, modify or block the order message from being transmitted to the exchange system or permit the order message to be transmitted to the exchange system.

In accordance with certain embodiments of the invention, the PCB may be used as a standalone board powered by a rack designed to house such standalone PCBs or configured as a Peripheral Component Interconnect Express (PCI-E) board hosted within a server. In at least one embodiment, a host server is preferably utilized to interact with the PCB, even though order messages received within the PCB need not be communicated to the host server in order for the checking function to be performed. The interface between the PCB and the host server may either comprise a Serial Port for standalone PCBs or a PCI-E interface for PCBs hosted within the host server.

In other embodiments, the PCB can be hosted directly within the client system via a PCI-E interface to avoid transmission of the order message across a first network to the PCB and then on to the exchange system. In such embodiments, the client system may be designed and configured to transmit order message data to the PCB via a PCI-E interface. The PCB would check the order message as further describe below and, if the order is not rejected, place the order message back into the client system's communication path leading to the exchange server.

Referring generally to the PCB, the PCB includes commonly known communication elements such as a physical layer (PHY) (e.g., Ethernet connection), media access control (MAC), and TCP/IP stack, as well as a processing agent. The communication elements function to physically receive the order message data across the network from the client system and de-pack the order message into payload data that can be processed by the PCB.

The PCB's processing agent comprises a transaction message handler. The transaction message handler is designed and configured to receive payload data from the TCP/IP stack and perform checking and other functions and communicate the order message back to the PCB's communication elements for eventual routing to the exchange server. The transaction message handler may also be configured to communicate the payload data to the processor of the host server for further processing.

In an alternate embodiment of the invention, a risk management system comprises a network switch communicatively connected, on an input side, to a client system configured to generate an order message and, on an output side, to an exchange system configured to receive the order message and execute a trade based on the order message, wherein the network switch includes programming operative to perform one or more checks on the order message, for example, to make a determination whether to block the order message from being transmitted to the exchange system or permit the order message to be transmitted to the exchange system.

The risk management system, in accordance with various embodiments of the invention, reduces latency in the transmission of orders and performance of risk management checks by avoiding the latency associated with passing order message payload data to the application layer (e.g. of the OSI Model) within a conventional server system. In conventional servers, the processing of data received via a network requires the data to be passed from the physical layer to the application layer, and ultimately processed by programming executed by the server's computer chip, e.g., x86 processor. This process inherently adds latency to the overall transmission and processing speed of the server due to the movement of data from physical components on an input side through various software-based layers to the application layer and then back through those layers to physical components on an output side. The embodiments of the risk management system advantageously avoid the afore-mentioned process by processing the order message payload data, to a desired extent, at the network layer. This advantageously reduces the latency in the transmission and performance of the risk checking function to better enable order messages to be checked in accordance with a broker-dealer's order requirements, a client's order requirements, and/or applicable law, rule or regulation.

Certain embodiments of the present invention will now be described in greater detail with reference to the figures. Turning first to FIG. 1, one illustrative relationship between the computer systems of a host, such as a broker-dealer, clients (e.g., those interested in trading securities) and an exchange (e.g., Tokyo Stock Exchange, New York Stock Exchange, alternative trading system or other electronic market for the trading of securities) is shown. More specifically, an exchange network, which may include various computer hardware for receiving, matching and processing orders for securities, is communicatively connected to have an outside facing network communicatively coupled to one or more switches ($S_1$, $S_M$), which may be connected to one or more client servers ($C_1$, $C_N$) via any known communication networks and/or protocols. The client servers ($C_1$, $C_N$) may each have a trading application, such as an order management system or algorithmic trading application and, in turn, may also be coupled to one or more switches ($S_1$, $S_Y$) coupled to an outward facing network of a host network. The host network may include, for example, one or more servers and databases for providing back-office, middle office and other support systems, order and position tracking, market data and any other desired components, data or services.

As will be described in greater detail below, the host may also include one or more servers ($H_1$, $H_X$), each of which may include one or more field programmable gate arrays (FPGAs) or one or more racks having one or more network processing units (NPUs) for performing active and/or passive risk checks. More specifically, each FPGA or NPU (which each include PCB's) may be coupled to a single client server, and each host server or rack ($H_1$, $H_x$) may have multiple FPGAs or NPU's for either a single client or multiple clients. As will be appreciated by those of skill in the art based on the discussion herein, where multiple FPGAs or NPUs are used for a single client, each such FPGA or NPU may include interconnections and programming for sharing trade, position, risk and other client related information as seen by such FPGA or NPU, as the case may be, between FPGAs and NPUs used for that same client on the same server and on different host servers ($H_1$, $H_x$). It should further be understood by those skilled in the art that the network connections and arrangement shown in FIG. 1 are merely exemplary, and changes may be made while keeping with the spirit of the present invention.

Figure 2:
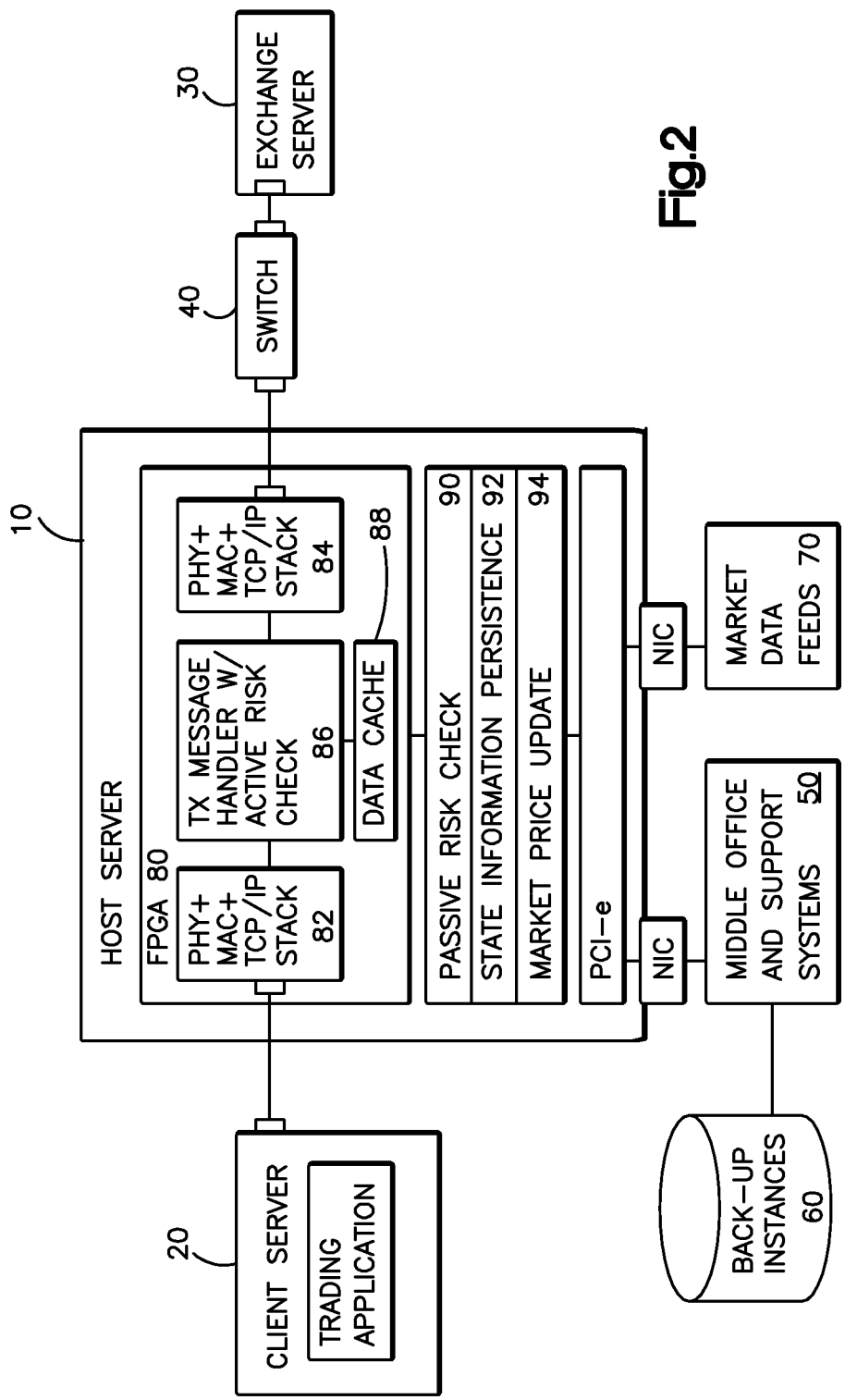
FIG. 2 is a schematic of certain components and logical modules of the host server according to one embodiment of the present invention, in which active and passive risk checks are performed on one or more host servers.

In a relatively simple embodiment, as shown in FIG. 2, a host server 10 sits between a client/server 20, and an exchange server 30, with a switch 40 interposed between the host server 10 exchange server 30. As shown, the host server 10 is connected to middle office and support systems 50, which in turn includes electronic storage 60 for backup instances of client, trade and position related data. These systems 50 provide symbology data, average daily volume, risk volumes, connection information (for example, which port or ports to use for communicating with the client server 20 and which for communicating with the switch 40), risk thresholds, cut off and shut down instructions in the event of violation of a risk check, and related data for performing the risk checks. In return, the systems 50 received from the host server 10 drop copies of the client order, copies of alerts (or rejection of an order) and execution information from the exchange server. In return, these systems 50 receive from the host server 10 drop copies of the client's orders and execution information from the exchange server 30. The host server 10 also receives real time market data feeds 70.

In the present embodiment, the host server 10 performs both active risk checks and passive risk checks and is responsible for persisting stage information and uploading pricing information to an FPGA 80. More specifically, the host server includes a printed circuit board having the FPGA 80 at the network layer, in direct communication with the client server 20 and switch 40. The printed circuit board may be a standalone board for a PCI-E board (such as an IPBlaze board) hosted within the host server 10. The FPGA 80 may interface with the host server 10 using either a PCI-E port or, may in a standalone version, use a serial port, and a JTAG connection to reconfigure the FPGA 80. The FPGA 80 may provide transparent access to the exchange 30 for the client 20 and perform parallel processing of the order message fields to automatically, as appropriate, either reject or pass through client orders to the exchange server 30.

More specifically, the FPGA 80 includes a physical, MAC and TCP/IP stack 82 that receives client orders and converts TCP/IP segments into payload data. Another physical, MAC and TCP/IP stack 86 passes (as appropriate) client orders on to the exchange server 30 after recreating the TCP/IP header.

The FPGA 80 is also programmed with a transaction message handler, which includes an active risk check module 86 and a data cache 88. In general, utilizing the FPGA 80 helps to reduce latency because the FPGA 80 includes the TCP/IP stacks and all the active risk check logic; as described below, preferably only the passive risk checks are performed off the FPGA 80 by virtue of the FPGA 80 passing a drop copy of the message data to the host server 10. In the present embodiment, the transaction message handler 86 includes components that further reduce latency for performing risk checks and passing on client orders. For example, the transaction message handler 86 preferably parses the order payload data into the appropriate fields (e.g. symbol, quantity, price, size) in parallel, thereby further reducing latency. The transaction message handler 86 uses the parsed data to perform active risk checks, again preferably in parallel. Thus, the length of time to perform all of the risk checks is roughly equal to the duration it takes to perform the slowest risk check, as opposed to typical processing which performs risk checks serially, in which case the time to perform all of the risk checks is equal to the aggregate duration to perform all checks. The transaction message handler 86 is further programmed to reduce latency by performing security symbol lookups (e.g., binary) on buckets of numerous bytes, for example 128 bytes, at a time.

The FPGA 80 also includes one or more data cache 88 for storing client, order and market data (e.g., symbol, price, average daily volume, etc.) as necessary to perform the active risk checks desired.

The host server 10 also includes various software modules residing in memory (such as RAM) for causing the host server processor to perform various processes. The host server 10 includes a passive risk check module 90, for performing various checks and, as appropriate, generating notifications and order modification or cancellation alerts or instructions, a state information persistence module 92, for persisting state information from the FPGA 80, and a market price update module 94, for loading market price data into the FPGA 80 (specifically, data cache 88). The FPGA 80 provides a drop copy of each client order data and each alert (or rejection of an order) to the host server 10 for additional processing and data management, including using these modules.

Figure 3:
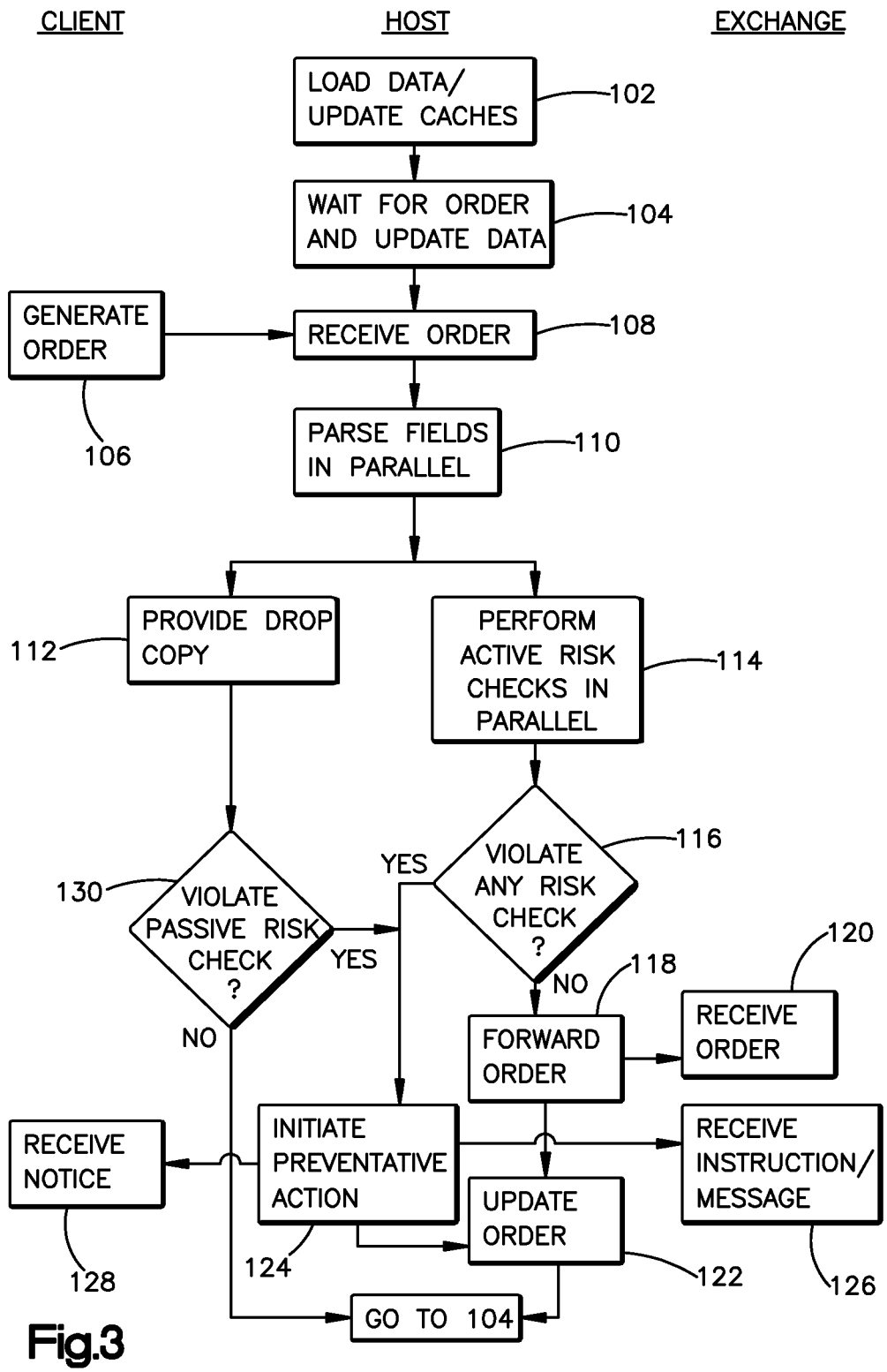
FIG. 3 is a flow chart showing the overall operation of certain embodiments of the present invention, including that of FIG. 2.

The operation of the foregoing embodiment will now be described with reference to the flow diagram of FIG. 3 and continuing reference to FIG. 2. As an initial step 102, certain information is loaded into the host server 10 from the middle-office and support systems 50, including preferably risk check thresholds, a stoplist of securities, inventory downloads and updates, client start of day position information, relevant communication port information, and any other client, security, position, or market data desired for use in performing the risk checks. The host waits for an order from the client, updating data business. Step 104. Virtually, the client will generate and transmit in order, which is intercepted by the host server 10 and, more specifically, the FPGA 80. Step 106.

The FPGA 80 receives the order (step 108), stripping the TCP/IP header information in the stack 82 and, as part of the transaction message handler 86, parses the order fields in parallel. Step 110. In the present embodiment, the relevant fields include symbol, quantity, price, and order type (i.e., new order or modification), although it should be understood that fewer or additional fields may be used in different embodiments. Once the fields are parsed, the FPGA 80 provides a drop copy to the host server 10 that is available to the passive risk check module 90. Step 112.

After parsing payload data of the client order into the relevant fields, the transaction message handler 86 proceeds to perform the active risk checks, preferably in parallel. Step 114. In the present embodiment, the active risk checks may include: (1) ensuring the security identified in the order is not a prohibited security by comparing the security in the order to a stoplist of (i.e., a list of prohibited) securities stored in data cache 88; (2) ensuring that the order quantity is less than a maximum risk threshold quantity for the security identified in the order by looking up the risk threshold quantity for the security and comparing it to the order quantity; and (3) ensuring that the order value (price multiplied by order quantity) is less than a set maximum risk threshold order value by looking up the threshold order value for the security in the order and comparing it to the calculated order value. In performing these active risk checks, the present embodiment utilizes a Symbol Price/Limit lookup table, which correlates each symbol (security) with a current price (as provided by and updated intraday (preferably in real-time) by the market price update module 94) and a threshold quantity. Active risk checks may include any check necessitated by Rule 15c3-5 or any other existing or hereafter enacted law, rule or regulation. It should further be understood that type and quantity of the active risk checks may vary in different embodiments, with a potential trade-off between the number and type of checks versus the order transmission latency; however, in certain embodiments, the active risk checks may be viewed as real-time risk management directed to ensuring compliance with primary regulatory items, mitigating market risk concerns and, in the present embodiment, introducing latency of less than 15 μs, whereas the passive risk checks are near real-time risk management directed to compliance with secondary regulatory items and the monitoring and altering of secondary market and counterparty risk.

If no risk checks are violated (step 116), then the TCP/IP stack 84 re-creates the message header, which is appended to the order data (having been stored in a buffer) and the order is forwarded to the switch 40 and only the exchange server 30. Step 118. The exchange server receives the order (step 120) acting on it (e.g., entering it into its order matching engine and either fully or partially executing the order). Any execution information is returned back to the host server 10 from the exchange server 30 and provided to the middle office and support systems 50. Transmission of the order may also result in the client and trade data being updated (step 122), including, for example, a copy of the order information being saved, both to be FPGA data cache 88 and, as a drop copy, to the host server 10 and middle office and systems.

In the event one or more of the risk checks are violated, the transaction message handler 86 initiates an appropriate preventative or rejection action. Step 124. It should be understood that reference to "preventative" is not intended to mean the order is strictly prevented from being transmitted or executed. In the present embodiment, if any of these three active risk checks are violated, then the order is rejected, which is accomplished in the present embodiment by modifying the client order to include a quantity of zero and permitting the order to be transmitted to and received by the exchange server 30. Step 126. For example, a decision component of the transaction message handler 86 may indicate whether to permit the order to be transmitted to the exchange or to replace the quantity field data with a value equal to zero, reassemble the order, add header information and transmit it to the exchange servicer 40. As will be appreciated by those skilled in the art, by modifying the order to have a quantity of zero, the order may be processed in accordance with the general order processing. In keeping with the desire to minimize latency, in the present embodiment, the transaction message handler 86 outputs an accepted or rejected signal at the earliest possible point, for example, immediately upon identifying a rejected risk check, rather than waiting for the longest risk check or additional risk checks to be accomplished. In other embodiments, different preventative action may be taken, for example, based on which risk check is violated (e.g., reducing the order quantity to a value greater than zero).

As with the case where no risk check has been violated, once it is determined that a violation has occurred and preventative action has been taken, the system updates the data as necessary (step 122), such as providing a drop copy of the instruction (e.g., modified order) to the host server 10 and middle office and support systems 50 and updating the data cache 88. In connection with taking preventative action (step 124), the host server 10 may also provide a notification of the risk check violation to the client/server (step 128).

As noted above, (step 112) a drop copy of the order data is provided to the host server 10 for performing the passive risk checks. The passive risk checks in the present embodiment may include: (1) ensuring the client's borrow limits are not exceeded; (2) ensuring short sell orders are transmitted only if permitted; (3) client position limits are not exceeded (e.g., for a particular security and/or overall market exposure; (4) ensuring proper order type (for sell order, the client position becomes or already is a short position after the order, the order type must be a short sell, not a sell to perform this the real-time position of the client is calculated and maintained beginning with the start of day position); (5) ensuring that for a short sell order, the limit price should follow the "up tick" rule; (6) checking the availability of the host (broker-dealer) to cover the clients short position in the security; and (7) any other check deemed desirable or required. To enable performance of the passive risk checks, the host server 10 includes a table for each client—security (symbol) combination containing the following information: number of shares of the security held by the client (which can be negative if stock is borrowed); average price of the shares held currently by the client; pending position (which is based on storing the order quantity and price of pending orders for the security); the client's borrowing limit for the security; a flag indicating whether or not short sell orders are allowed for this client in the particular security; and inventory available (against which a short sell order request is checked to determine whether a trade should be allowed). It should be understood that the information stored on a security-by-security basis may be aggregated to enable checks based on the client's entire portfolio of securities and exposure (e.g., a passive risk check based on total value of borrowed shares). The passive risk checks are performed and the host server 10 determines whether any passive risk check is violated. Step 130. Unlike the active risk checks, in the present embodiment the passive risk checks are performed by the host server processor and, as such, may be performed serially. Consequently, to reduce latency for acting on the passive risk checks, host server 10 will initiate preventative action as soon as any of the passive risk checks is violated. Step 124.

The preventative action taken based on violation of a passive risk check may be on an order-by-order basis or a client basis. Specifically, the passive risk check module 90, after determining a violation of a passive risk check, may initiate: (1) a cancellation of the specific offending order to the exchange server 30 (such an instruction being referred to as a "chasing" cancel because the cancel is initiated after and is following the order provided to the exchange), (2) a mass cancellation (i.e., cancellation of all of the clients pending orders (on the exchange that received the order or all exchanges to which the client transmits orders via the host)); (3) cutting off or terminating client's connection to or session with the exchange server 30 (e.g., by sending a message directly from the host server 10 NIC to the switch 40 or in alternate embodiments, to a switch interposed between the client server and the host server); and any other desired or required action. Because an order may have already been rejected based on the active risk checks by the time the passive risk checks are run, before initiating an order cancel instruction, the host server 10 (e.g., based on evaluation of the state information persistence module 92) preferably will first determine whether the order has already been rejected so as to avoid duplicate rejections. As with the active risk checks, once the preventative action is taken for violation of a passive risk check, relevant data in fields may be updated. Step 122.

Once each of the active risk checks and passive risk check are performed, the host continues by waiting for the next order and updating data as necessary. Step 104.

Message Sequence Handling

In connection with accepting or rejecting the inbound messages received from the client server 20, in certain embodiments, the FPGA 80 includes components and logic for checking and sequencing such inbound messages and exchange generated messages. As should be understood by those skilled in the art, the logic for handling such message sequencing may depend on the particular message protocol and specifications of the particular exchange. For example, in the present embodiment, when dealing with NASDAQ and the OUCH protocol, sequence number handling is relatively simple because the inbound messages are not sequenced and the sequence number of the outbound sequenced message is implicit and a Replace Order with Market Order will be rejected to avoid keeping an order book.

In the present embodiment, during normal session flow, the FPGA 80 includes an exchange message first in-first out (FIFO) buffer, an inject message FIFO buffer, and a sequence number handler module that receives messages from each buffer and that tracks the relationship between the implicit outbound sequence number and the injected messages. The ordering of all exchange generated sequenced messages and the rejected messages is kept using a data structure. Such data structure may be an array of integers, InjectArray[i]=j, where the (i+1)th injected message is injected after the jth exchange message. For example, the first client-injected message (i=1) occurs when there has been no exchange messages (j=0); following the first exchange message (j=1), the next client injected message is (i=2).

In the event a client connection to the host server is dropped, the client preferably will re-login with a new expected sequence number, and the expected sequence number from the exchange point of view will be communicated. If the implicit exchange sequence number is greater than the value of the then current InjectArray element, the element index is incremented by 1 and the FPGA 80 passes the message to the client server 20. If the exchange sequence number is the same as the value of the InjectArray element, the FPGA 80 passes the first message to the client server and then sends an inject message, incrementing the element index. If the InjectArray element does not change, a new inject message is sent, and the element index is incremented. If the InjectArray element changes, the system waits for a new exchange message. If the element index passes the array value, the reconnection mode ends.

In certain embodiments, sequence number handling, where ArcaDirect is the exchange, may be similar to the handling process for OUCH, despite the fact that in Arca-Direct, both inbound (client to exchange) and outbound messages have a sequence number. Unlike with OUCH, the sequence number handler also updates the sequence for outbound messages (i.e., exchange to client). The reconnect scenario is also similar, except that with ArcaDirect, the logon message includes the last sequence number, instead of the next sequence number, as with OUCH.

The inbound message sequence handling accounts for the potential to have a message rejected and an inject message to the exchange. A logical total order of the messages sent and rejected may be kept. A data structure that may be used to encode this information is an array of tuples, MsgEventArray[i]=(j,k), where the (i+1)th event happens after the jth client message. Where k>0, then it represents an injection event and k equals the number of the injected messages at that point in time. Where k<0, then it represents a reject event and −k equals the number of rejected messages at that point. The resultant sequence number of the inbound message equals the client sequence number plus the number injected less the number rejected. This data structure can be used in the reconnect mode, which would involve walking the MsgEventArray structure to determine the number of messages the FPGA needs to resend to the exchange. From the structure, the number of rejects and the number of injected messages can be computed. Injected messages can be retrieved from the host via PCI Express.

Message Delimiter Detector

One illustrative message delimiter detector of the transaction message handler 86 will now be described with reference to FIG. 4 and Tables 1 (message delimiter parameters) and 2 (message delimiter signals), below. The message delimiter of the present embodiment is responsible for detecting message start and end, handling the control signals of an RX FIFO buffer that receives the TCP/IP payload message, indicating the valid bytes for each word received, handling the flow control between the message handler and the TCP offload engine (TOE) and multiplex any multiple connections channel. In such an embodiment, the TCP/IP stacks will handle TCP/IP packet resend/reordering, the payload message arrival will always be in order, and any partial TCP/IP packet will be stored in the RX FIFO.

Figure 4:
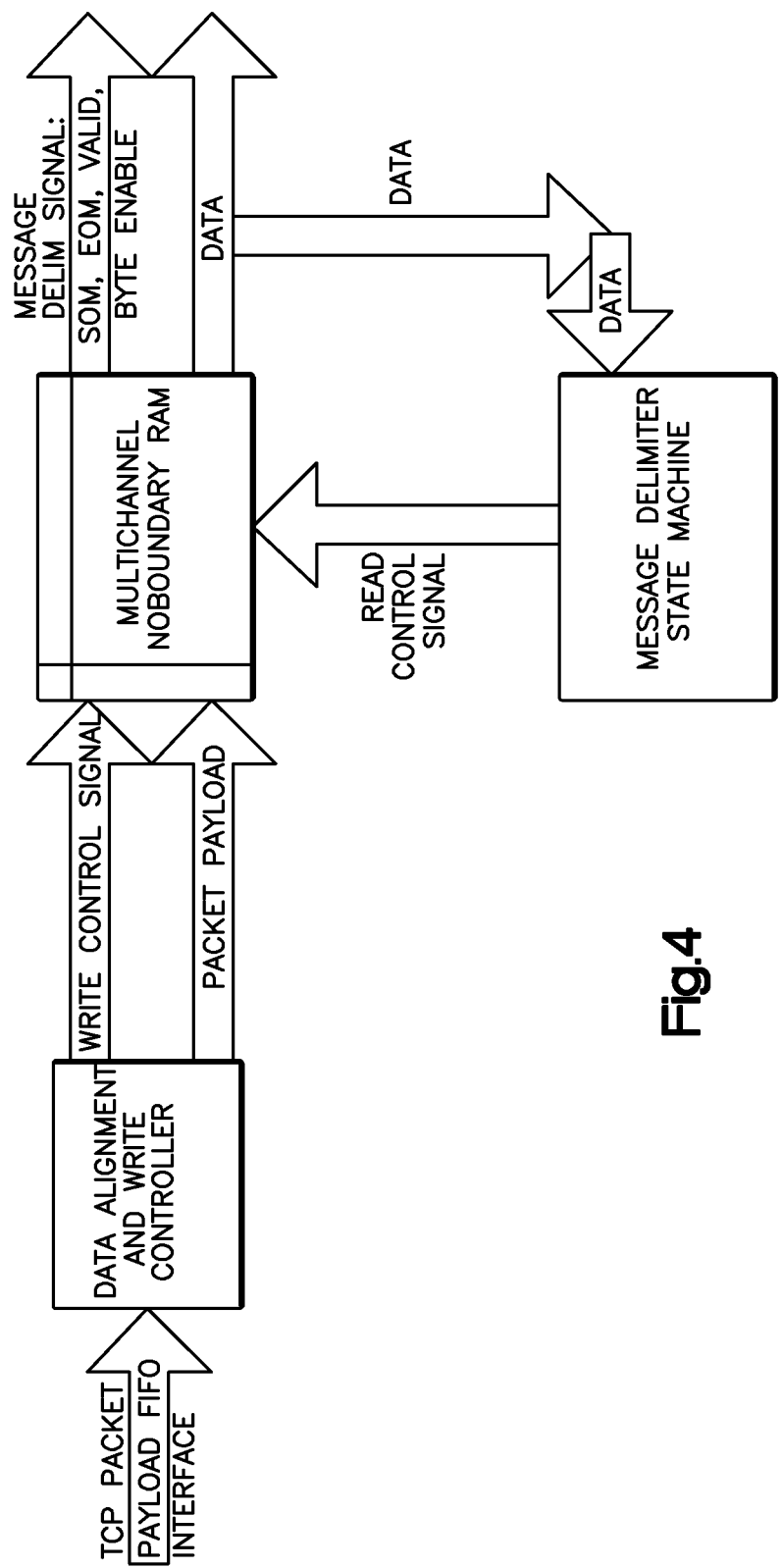
FIG. 4 is a schematic of a message delimiter detector of certain embodiments of the present invention, including that of FIG. 2.
Figure 4A:
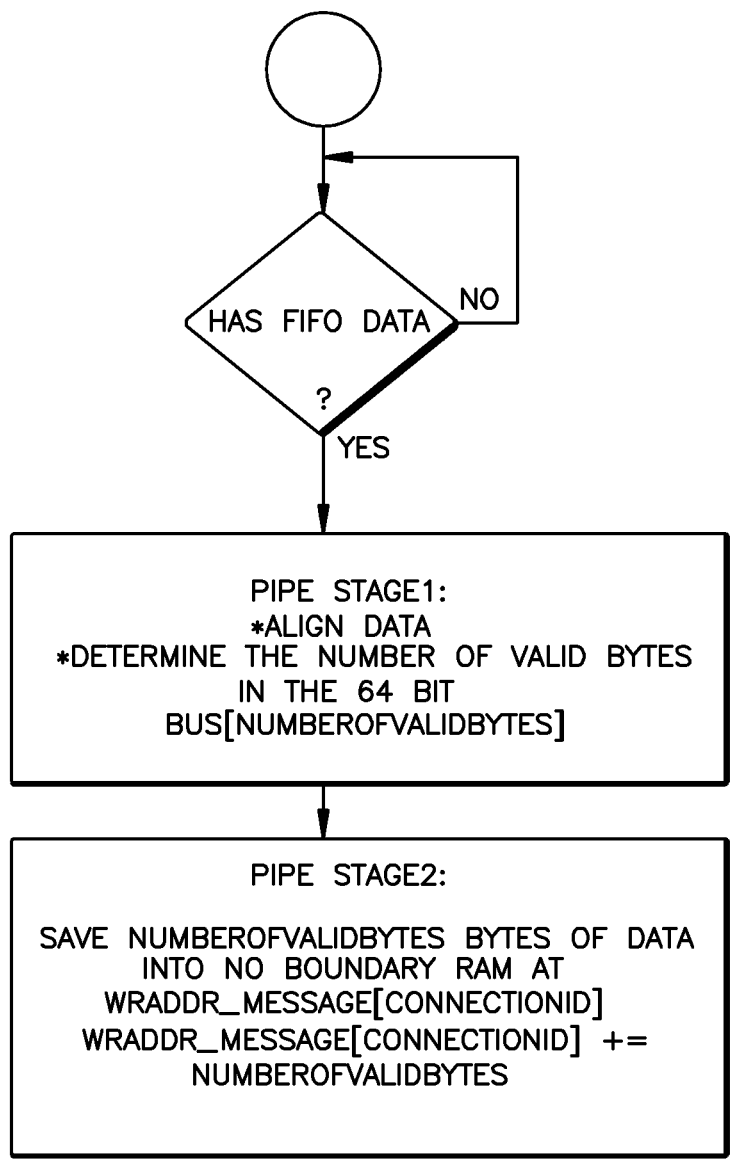
FIG. 4A is a flow diagram illustrating the logic and operation of a data alignment and write controller of the message delimiter detector of FIG. 4.

As illustrated in FIG. 4, the present message delimiter detector includes three primary components or modules. First, the message delimiter detector preferably includes a data alignment and right controller, which consumes data from a TOE FIFO interface and writes the data into a multi-channel, no boundary RAM. The logic and operation of the data alignment and write controller module is further illustrated in FIG. 4A.

Second, the message delimiter detector preferably also includes a multichannel, no boundary RAM. The multichannel, no boundary RAM comprises a separate RAM per byte and forms one logical word. As a result, unlike a conventional RAM, it can be written in red at any offset and there is no need to account for byte alignment. As will be appreciated by those of skill in the art, this greatly simplifies the right controller and state machine logic. In the present environment, one channel per connection is used, although other arrangements may be used in alternate embodiments.

Third, the message delimiter detector preferably also includes a message delimiter state machine, as illustrated in FIG. 4. The message delimiter state machine reads data from the no boundary RAM and generates the SOM and EOM signals described herein. FIG. 4B illustrates the logic and operation of the state machine module.

TABLE 1

Message delimiter parameters.

| Parameter Name | Range | Description |
|---|---|---|
| DAT_WIDTH | 32-64 | Data width of the data bus in bits |
| maxNumberOfConnections | 64 | Max number of Connections |

TABLE 2

Message delimiter signals.

| Signal Name | Width/Polarity | Type | Description |
|---|---|---|---|
| rst | Active High | Input | Reset signal used by the block |
| Clk | Active High | Input | Clock which is 156 Mhz to 200 Mhz |
| conn_state_i | 4 | Input | Connection state. Please refer to the TOE reference guide for more details. |
| fifo_tx_alomst_full_i | Active High | Input | Almost full signal used to indicate the status of the FIFO. Please refer to the TOE reference guide for more details. |
| fifo_rx_fill_lvl_i | 15 | Input | Fill level signal used to indicate the status of the FIFO. Please refer to the TOE reference guide for more details. |
| fifo_rx_fin_rev_i | Active High | Input | Connection finish received. Please refer to the TOE reference guide for more details. |
| fifo_rx_be_i | (DAT_WIDTH/8) | Input | Byte enable for the data from the TOE. Please refer to the TOE reference guide for more details. |
| fifo_rx_connectionId_i | Log2(maxNumberOfConnections) | Output | The connection id corresponding to the input data. |
| fifo_rx_vld_i | Active High | Input | Data byte valid from the TOE. Please refer to the TOE reference guide for more details. |
| fifo_rx_d_i | DATA WIDTH | Input | Actual data from the TOE. Please refer to the TOE reference for guide more details. |
| fifo_rx_data_ready_i | Active High | Input | Receive data ready. This is signal to the receive side to indicate that data can be forwarded. |
| fifo_rx_rd_wd_o | Active High | Output | Read enable signal to read from the TOE FIFO. |
| fifo_rx_data_valid_o | Active High | Output | Data valid signal towards the message handler. |
| fifo_rx_start_of_message_o | Active High | Output | Start of message signal towards the message handler. |
| fifo_rx_end_of_message_o | Active High | Output | End of message signal towards the message handler. |
| fifo_rx_connectionid_o | Log2 (maxNumberOfConnections) | Output | The connection id corresponding to the data. |
| fifo_rx_byte_valid_o | (DAT-WIDTH/8) | Output | Number of valid bytes on the data bus towards the message handler. |
| fifo_rx_data_o | DAT-WIDTH | Output | Data towards the message handler. |

Message Field Parsing

Figure 5:
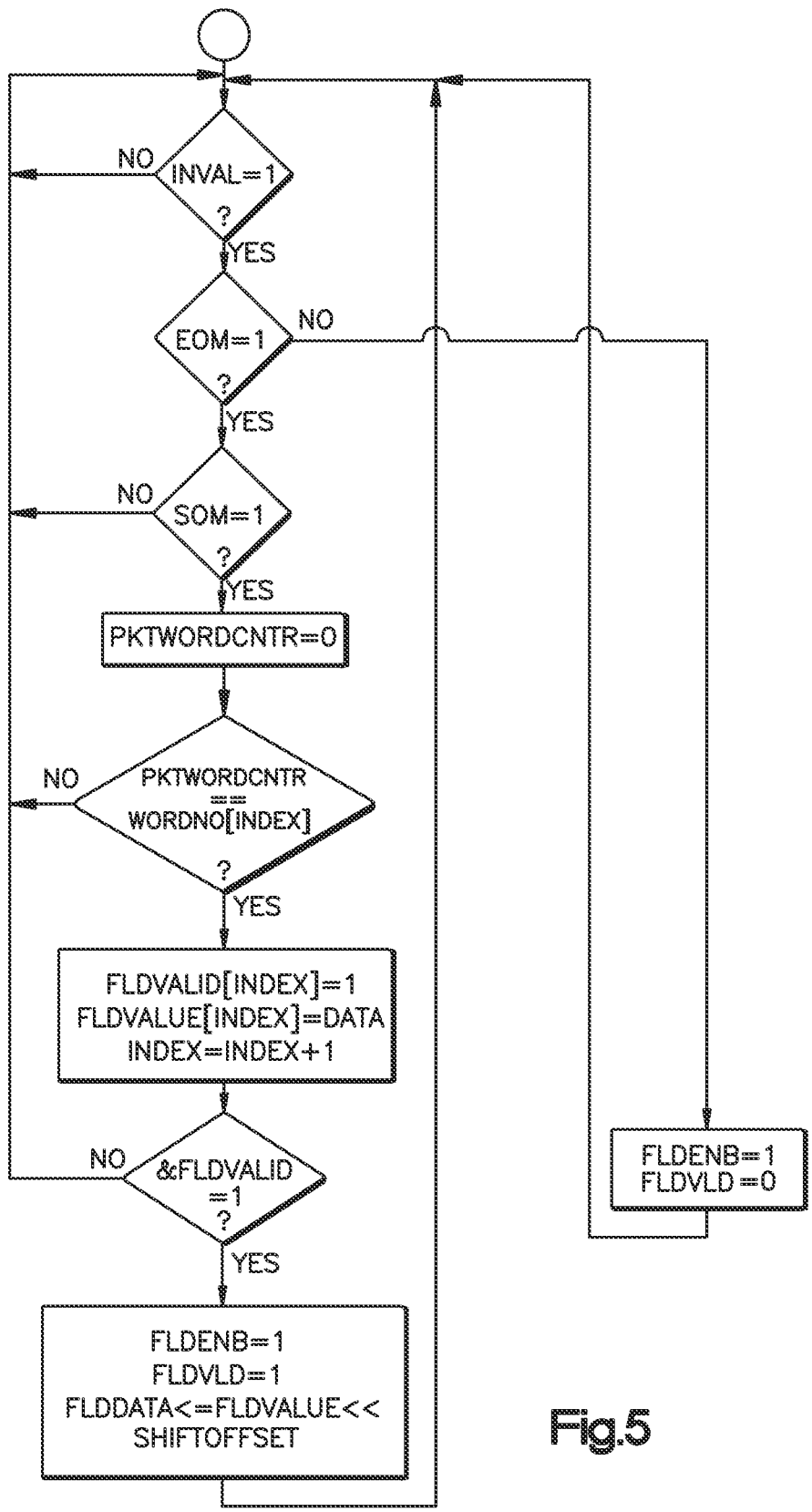
FIG. 5 is a flow diagram illustrating the logic and operation of a field extractor of certain embodiments of the present invention, including that of FIG. 2.

As noted above, the present environment further reduces latency by virtue of the FPGA 80 extracting the fields of the client order in parallel. One illustrative field extractor of the transaction message handler 86 for performing this function will now be described with reference to FIG. 5. The component is preferably a generic block which is parameterized like a C++ template class.

The field extractor receives messages (no storage) and extracts a given field from the message. More specifically, the field extractor receives the message without blocking message data, extracts the expected field using starting and ending byte offset and presents the field to the other logic components on the FPGA 80 (e.g., comparators that implement the active risk checks) at the soonest available time for further computation. The present embodiment may be used in fixed offset protocols. As such, the field extractor may be used for extracting the following fields for protocols such as OUCH and Arrowhead: message type, price, quantity, symbol, and order type.

The logic of the field extractor of the present embodiment is shown in the flow diagram of FIG. 4, and the parameters used by the field extractor of the present embodiment are set forth in Table 3, below, and the signals used by the field extractor of the present embodiment are set forth in Table 4, below. It should be understood that the present embodiment preferably includes multiple field extractor components reading the same message data from a bus. If there is more than one field (e.g., in a single 64 bit word), then each field extractor may be extracting a different field, in parallel (i.e., in the same clock cycle), thereby further reducing latency.

TABLE 3

Field Extractor Parameters

| Parameter Name | Range | Description |
| --- | --- | --- |
| NoOfLookups | 1-64 | Number for words the field could be spread apart on. Example 1: Data width is 4 Bytes and field we are looking for is 2 Bytes if can be across 2 words. Example 2: Data width is 4 Bytes and field we are looking for is 6 Bytes if can be across 3 words. |
| DataBits | 32/64/128/256/512 | Data bus width |
| ModBits | Log2(DataBits/8) | Bits to indicate the bytes valid in last word. This is dependent on the DataBits. |
| EomBits | 1 + ModBits | This is to indicate the width store, the end of message, and mod signal. |
| MaxPktSize | 8-512 | Max packet size in words |
| L2MaxPktSize | Log2(MaxPktSize) | Log 2 of MaxPktSize |
| FieldWidth | 1-256 | Width of the field being extracted |
| ConBits | 1-5 | Bits to identify separate connections |
| SomBits | Derived | 1 + ConBits |

TABLE 4

Field Extractor Signals

| Signal Name | Width/Polarity | Type | Description |
| --- | --- | --- | --- |
| Rst | 1/Active High | Input | Reset Signal |
| Clk | 1/Active High | Input | Clock signal |
| StOffSet | ModBits + Log2MaxPktSize | Input | Starting byte offset |
| EdOffSet | ModBits + Log2MaxPktSize | Input | Ending byte offset |
| InVal | 1/Active High | Input | Input data valid signal. All the signals are valid only if this signal is high. |
| InSom | SomBits | Input | Input start of message signal. This signal has two parts start of message and the connection number associated with the message. |
| InEom | EomBits | Input | Input end of message signal and mod combined. This signal is valid only if InVal signal is high. Bottom bits of the signal are modulo and top bit is end of message signal. |
| InDat | DataBits | Input | Input data signal. This signal is valid only if InVal signal is high. |
| FldEnb | 1/Active High | Output | Field extraction output enable. When this signal is high the field value is valid. |
| FldVal | 1/Active High | Output | Field extraction output valid. This means the field was extracted without any error. |
| FldDat | (FieldWidth*8) | Output | Field extraction output value. This is the actual field value. |
| OutVal | 1/Active High | Output | Output data valid signal. All the signals output are valid only if this signal is high. |
| OutSom | SomBits | Output | Output start of message signal. This signal is valid only if OutVal signal is high. |
| OutEom | EomBits | Output | Output end of message signal and mod combined. This signal is valid only if OutVal signal is high. Bottom bits of the signal are modulo and top bit is end of message signal. |
| OutDat | DataBits | Output | Output data signal. This signal is valid only if OutVal signal is high. |

ASCII to Integer Converter

Figure 6:
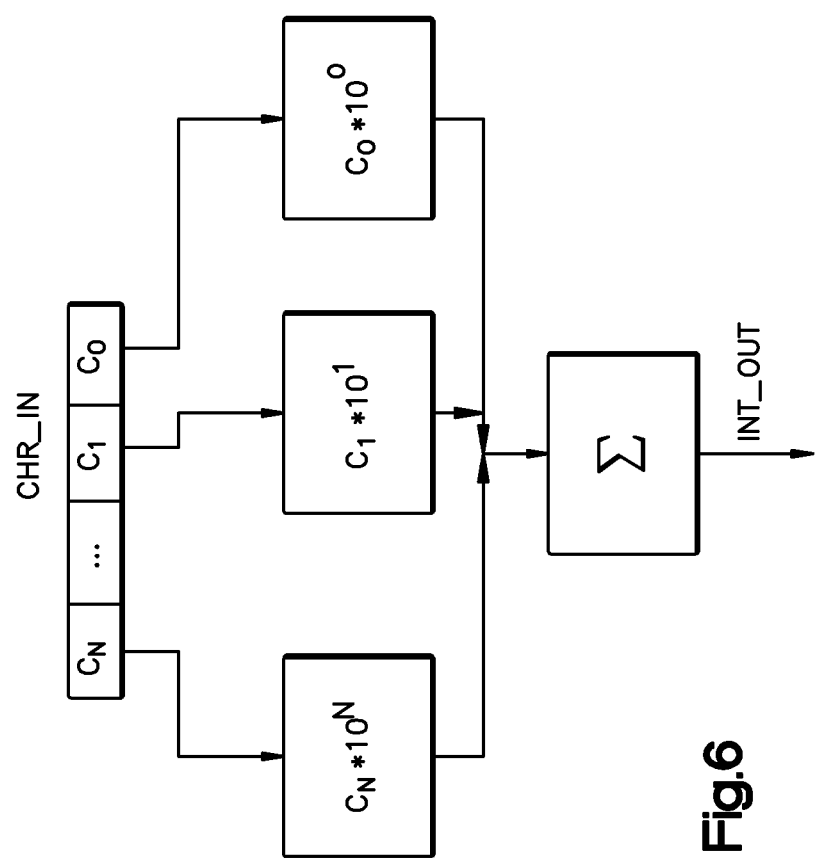
FIG. 6 is a schematic of an ASCII to integer converter of certain embodiments of the present invention.

In certain embodiments, the transaction message handler 86 includes an ASCII to integer converter, which will be understood by those of skill in the art be very useful for protocols which are character-based, such as FIX, and is useful in further reducing latency. FIG. 6 illustrates one parameterized ASCII to integer conversion module of the transaction message handler 86, which will now be described. The ASCII to integer converter receives the length of the character field and gives the integer value in 0(0) number of clocks. In other words, regardless of the number of characters in the ASCII string (e.g., two digits in "10" versus five digits in "10000"), the time (number of clock cycles) required to convert the ASCII to integer is constant. The module is used in converting the price field and converting the quantity field in character-based protocols, such as FIX.

The present ASCII to integer converter utilizes the parameters and signals in Tables 6 and 7, respectively, below.

TABLE 6

ASCII to integer converter parameters.

| Parameter Name | Range | Description |
| --- | --- | --- |
| StrLen | 1-32 | String length |
| IntBits | 1-128 | Size in bits of the integer result |

TABLE 7

ASCII to integer converter signals.

| Signal Name | Width/Polarity | Type | Description |
| --- | --- | --- | --- |
| Rst | 1/Active High | Input | Reset Signal |
| Clk | 1/Active High | Input | Clock signal |
| val_in | 1/Active High | Input | Indicator that the string can be sampled. |
| chr_len | StrLen*8 | Input | String to be parsed |
| val_out | 1/Active High | Output | Valid to indicate that the integer result can be sampled. |
| int_out | IntBits | Output | Integer result |

Drop Copy Buffer and Handling

Figure 11:
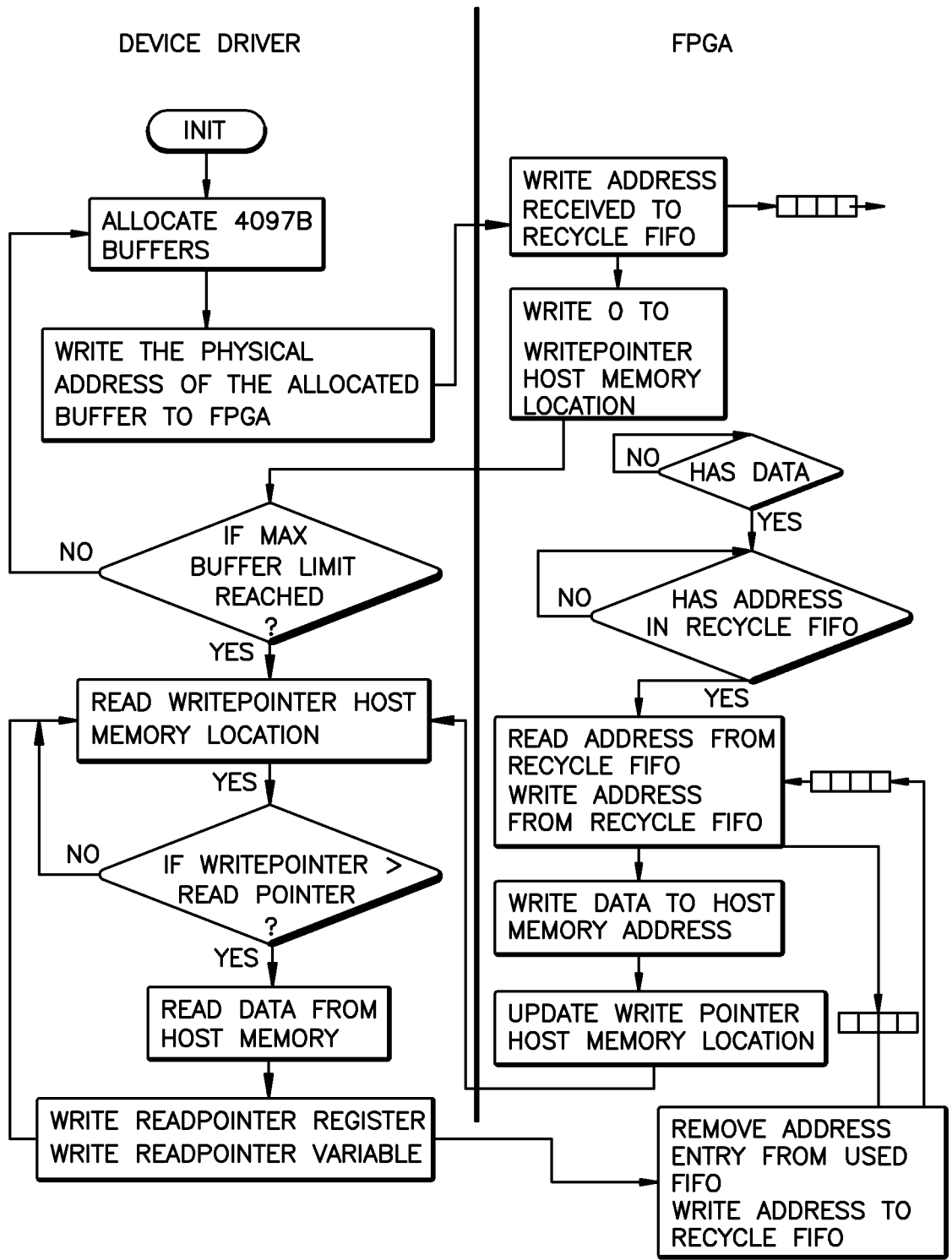
FIG. 11 is a flow diagram illustrating the logic and operation of a drop copy buffer, including host server device driver and an FPGA, of certain embodiments of the present invention, including that of FIG. 2.

One illustrative logical flow for handling the creation and delivery of drop copies will now be described and is shown in FIG. 11. On driver initialization, the driver will write n (e.g., 1-256 in the present embodiment) fixed sized, pre-allocated buffer address into a device register (e.g., DropCopyBufferAddressWriteReg) on the FPGA 80. These writes will populate a FIFO in the FPGA 80 which it will use as a circular buffer to dump the drop copy data. In the present embodiment, two are used for a client (one for the client and one for the host server), although in an alternate embodiment the two paths are multiplexed. The FPGA 80 may re-use these buffers in the order they were presented in a circular manner. The process to avoid the overwriting of the buffer before the host is able to read it is discussed below.

Once all values are populated in the register, the FPGA 80 will be in a ready state. Once drop copy data is available, the FPGA 80 will write a register in host memory with the current write pointer. This register is preferably continuously polled by memory of the host server 10. The FPGA 80 also pushes the data to the host memory address given by the host at initialization (init) time by direct memory access. Once the host server 10 determines the write address was incremented, it reads the data record (128B), processes it and writes a read pointer back to the FPGA 80 indicating the record was read.

One illustrative structure for the data record is described in Table 5, below.

TABLE 5

Drop copy data structure.

| Field | Offset | Length | Description |
| --- | --- | --- | --- |
| Size | 0 | 1 | Size of payload (max 116) |
| Connection ID | 1 | 1 | Higher 6 bits: ID associated with connection |
| Direction/Code | 2 | 2 | Higher 2 bits: 00 - Client Incoming 01 - Client Outgoing 10 - Exchange Incoming 11 - Exchange Outgoing Lower 14 bites: Event(log) code. If zero, indicates connection raw data in the payload. Connection ID and Direction would be set if lower 14 bits are 0. Connection ID and Direction could be 0 for events |
| Timestamp | 4 | 8 | Nanos |
| Data | 12 | 116 | Payload |

The format is shared by the drop copy data and log entry operations. The log entry operation has codes associated with each entry. Such codes indicate whether the client to exchange and exchange to client connections are open and ready, provide indication of buffer events (e.g., reject generate, threshold exceeded, entry overflow/underflow for the drop copy buffer and/or log buffer), and any exchange specific errors in accordance with such exchange's protocol.

As noted above various alternate embodiments in which the active risk checks are not performed by the host server are within the scope of the present invention. One such embodiment will now be described with reference to FIG. 7. As will be apparent to those skilled in the art based on the present specification, this embodiment is based on the foregoing embodiments but places the FPGA and the associated active risk check logic on a PCB on the client server, as opposed to a host server apart from client's server. As illustrated, a trading application, such as an order management system or algorithmic trading application, resides on the client server. A sockets library intercepts the order flow from the trading application and redirects it so that, rather than being delivered to the NIC for delivery to the switch and exchange server, the order is delivered to specific device drivers and, via a PCI-e connection, to the FPGA and resident transaction message handler having at his risk check components and logic. In an alternate environment, the trading application communicates with a host API (application programming interface) which redirects the order flow to the drivers for provision to the FPGA.

As will be apparent to those skilled in the art, because the active risk check module is provided on the FPGA at the client server, the host server preferably must provide the data necessary for performing the active risk checks to the client server and FPGA installed therein.

In operation, the FPGA performs the active risk checks and, if no violation, assembles the TCP message for delivery to the exchange server (e.g., by way of a switch). The host server receives a drop copy of the order from the client/server and performs the passive risk checks via a resident passive risk check module.

Because the present embodiment, like the embodiment of FIG. 2, includes performing the active risk checks on a network device and thus at the network layer, latency may be reduced because the order does not need to be communicated to the various other layers within the OSI model. Further, the various specific features for reducing latency, such as parsing the order fields in parallel and performing the active risk checks in parallel, are maintained in the present embodiment. It should also be noted that, as with the environment of FIG. 2, the FPGA may be replaced with a network processing unit (NPU) and the client/server may include multiple FPGAs and NPUs.

Figure 7:
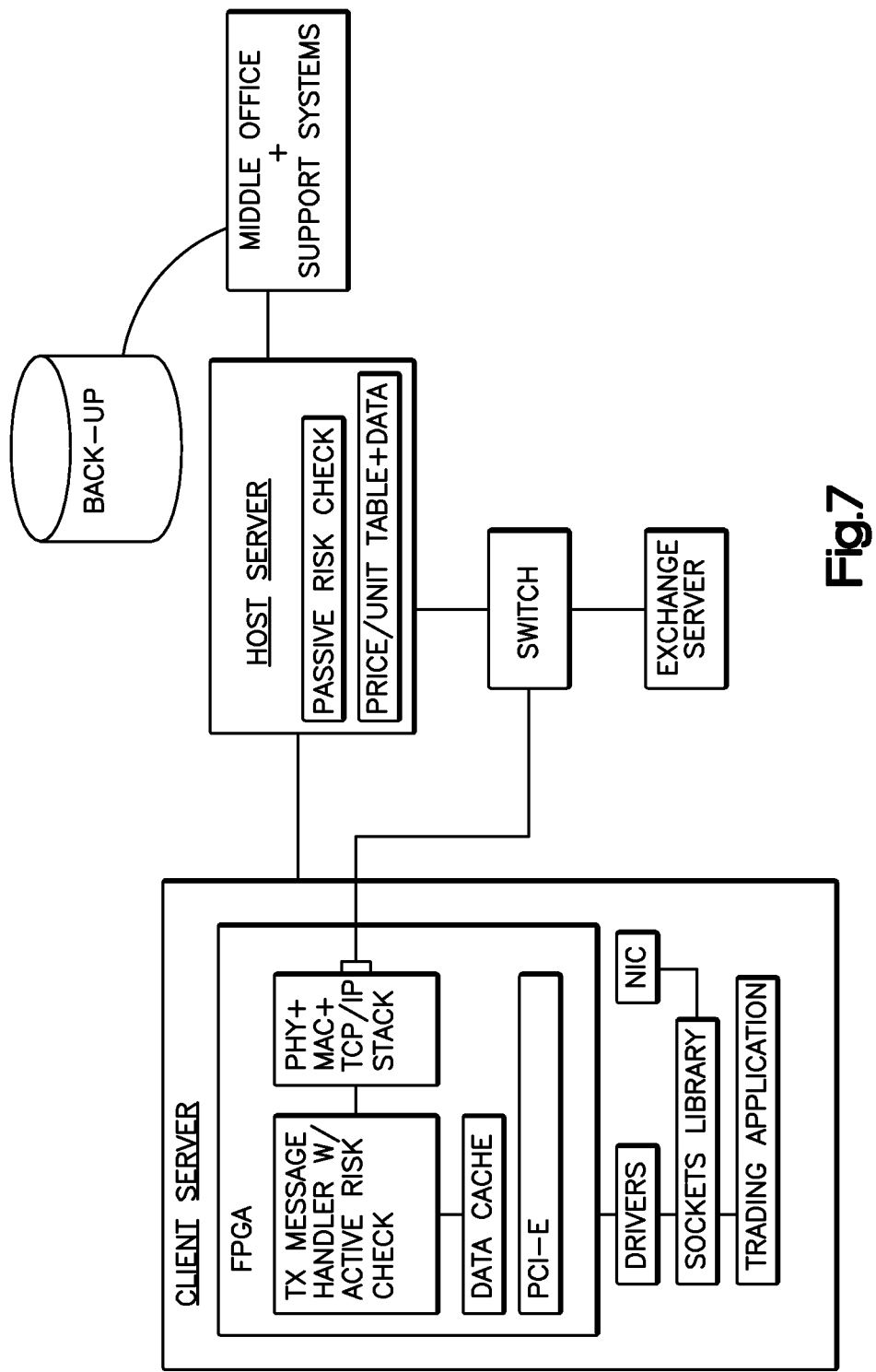
FIG. 7 is a schematic of certain components in an alternate embodiment of the present invention, in which active risk checks are performed on the client server.
Figure 8:
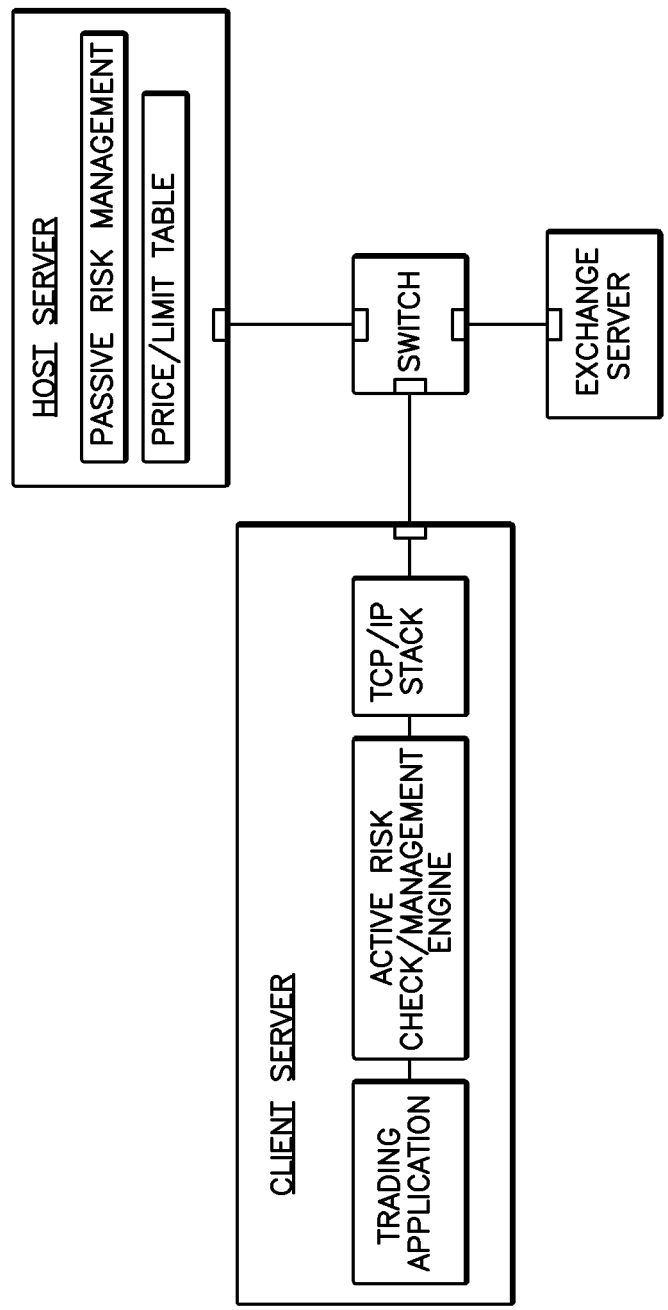
FIG. 8 is a schematic of certain components in another alternate embodiment of the present invention, in which active risk checks are performed on the client server.
Figure 9:
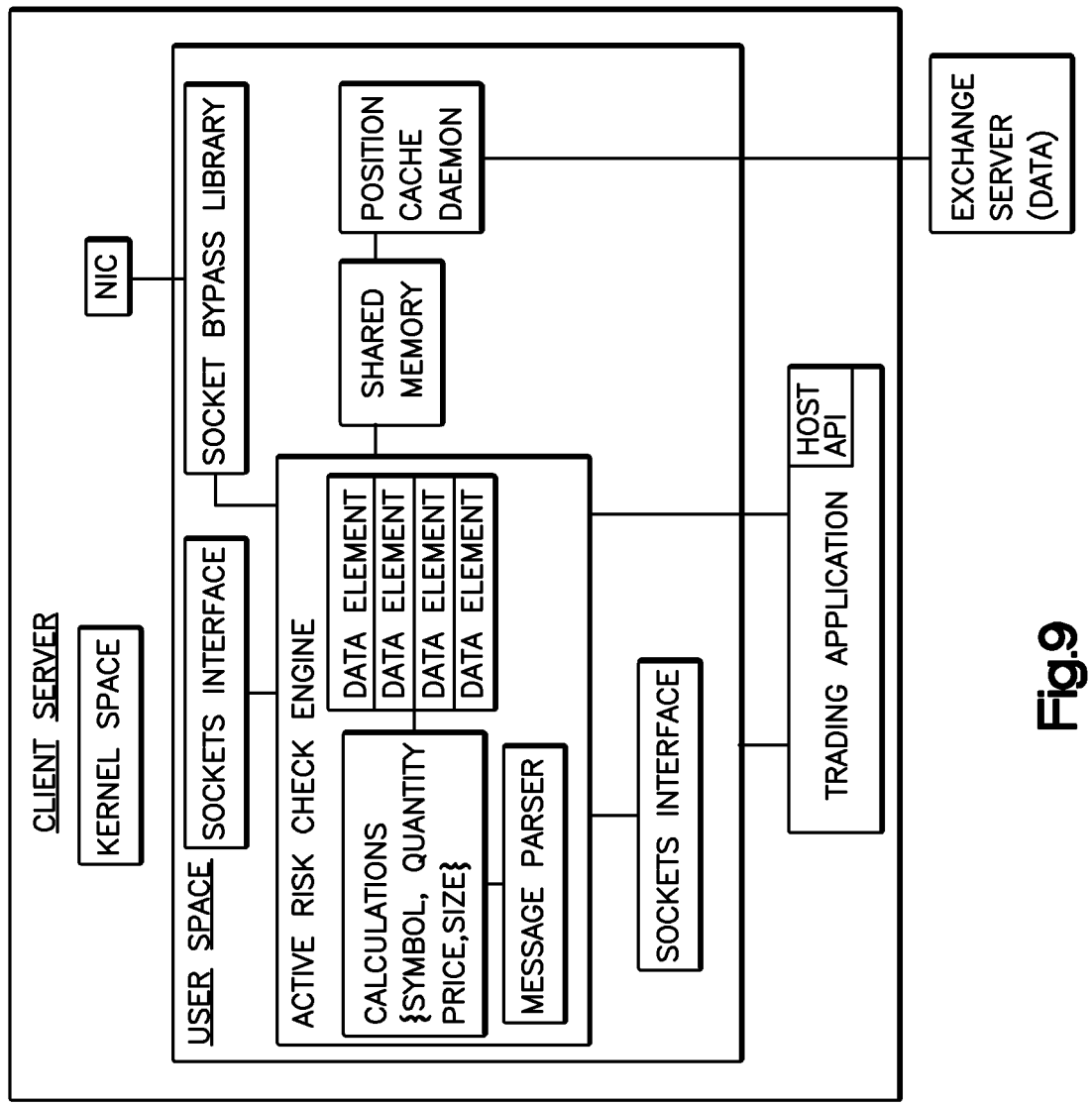
FIG. 9 is a detailed schematic of certain components and logical modules of the client server according to one embodiment of the present invention, including that of FIG. 8.

FIGS. 8 and 9 illustrate yet another alternate embodiment, in which the active risk check is performed on the client server; however, unlike the embodiment of FIG. 7, the active risk checks are performed via software without an FPGA or NPU. The embodiment of FIG. 8 mirrors that of FIG. 7 with the client/server performing the active risk checks and the host server performing the passive risk checks. The client/server includes a trading application in communication with an active risk check engine, which in turn is in communication with a TCP/IP stack for providing client orders to a switch and ultimately to the exchange server.

FIG. 9 illustrates an example of the client server of FIG. 8. In general, the client/server includes a trading application communication with a host API that diverts the orders to the active risk check module in the user space of the client/server. As noted above, in alternate environment, rather than use a host API, a sockets library may be used for redirecting the trading application order flow to the user space.

Within the user space of the client server is an active risk check module, which includes a module for parsing the order message and performing the active risk checks. As with prior embodiments, the message parser (or extractor) module parses the order message into its various fields in parallel. Similarly, as with prior embodiments, the active risk checks are calculations based on symbol, quantity, price and size (value) and may be performed in parallel. Specifically, each risk check or calculation is performed by a separate data element in parallel.

In performing the active risk checks, the active risk check engine accesses memory which is shared with a position cache daemon. The position cache daemon receives a data feed from the exchange server containing responses to the clients orders on the exchange and thus the client's positions. The position cache daemon is for gathering client position information from multiple systems, if any on which the client trades (e.g., FPGA based or any other trading systems) and providing a unified view of the current aggregated positions of a client.

The active risk check engine determines whether or not any of the active risk checks are violated and either initiates creation of the order for transmission to the switch and exchange server or rejects the order (e.g., modifying the order to be for a quantity of zero). By virtue of a socket bypass library, messages may be provided directly to the NIC.

In one embodiment, the system comprises an inspection node that utilizes a network processing unit (NPU) that operates within the network layer of the network protocol defined by the specific exchange to which the order may be routed in order to reduce latency in the communication of the order message from the trading strategy engine and the exchange server. Within the inspection node, the NPU operative within the network layer preferably uses a deep packet inspection (DPI) methodology in order to examine the data portion of a data packet as its passes through the inspection node.

For example, in the embodiment currently being described, a system for analyzing orders for the purchase or sale of a security comprises an inspection node interposed between a client system (incorporating a trading strategy or order routing engine) and an exchange system, wherein each of the inspection node, client system and exchange system are communicatively connected via a network. The inspection node includes an NPU programmatically designed and configured to analyze the order message in accordance with certain pre-defined characteristics and make a determination whether to pass the order message through to the exchange system or take some other action (e.g., flag or block the order message). By way of non-limiting example, the inspection node preferably includes programming that functions to evaluate a client's trade orders for compliance with one or more regulatory rules, such as Rule 15c3-5.

As such, the programming operative on the NPU of the inspection node actively monitors client trade orders and determines if a violation has occurred. If a violation has occurred, the programming may be designed and configured to prevent the client trade order from being communicated to an exchange system for execution, deliver a message to the client and/or host broker-dealer, flag the order for later review or take other action as may be necessary or desirable to attempt to prevent execution based on the rejected order.

Figure 10:
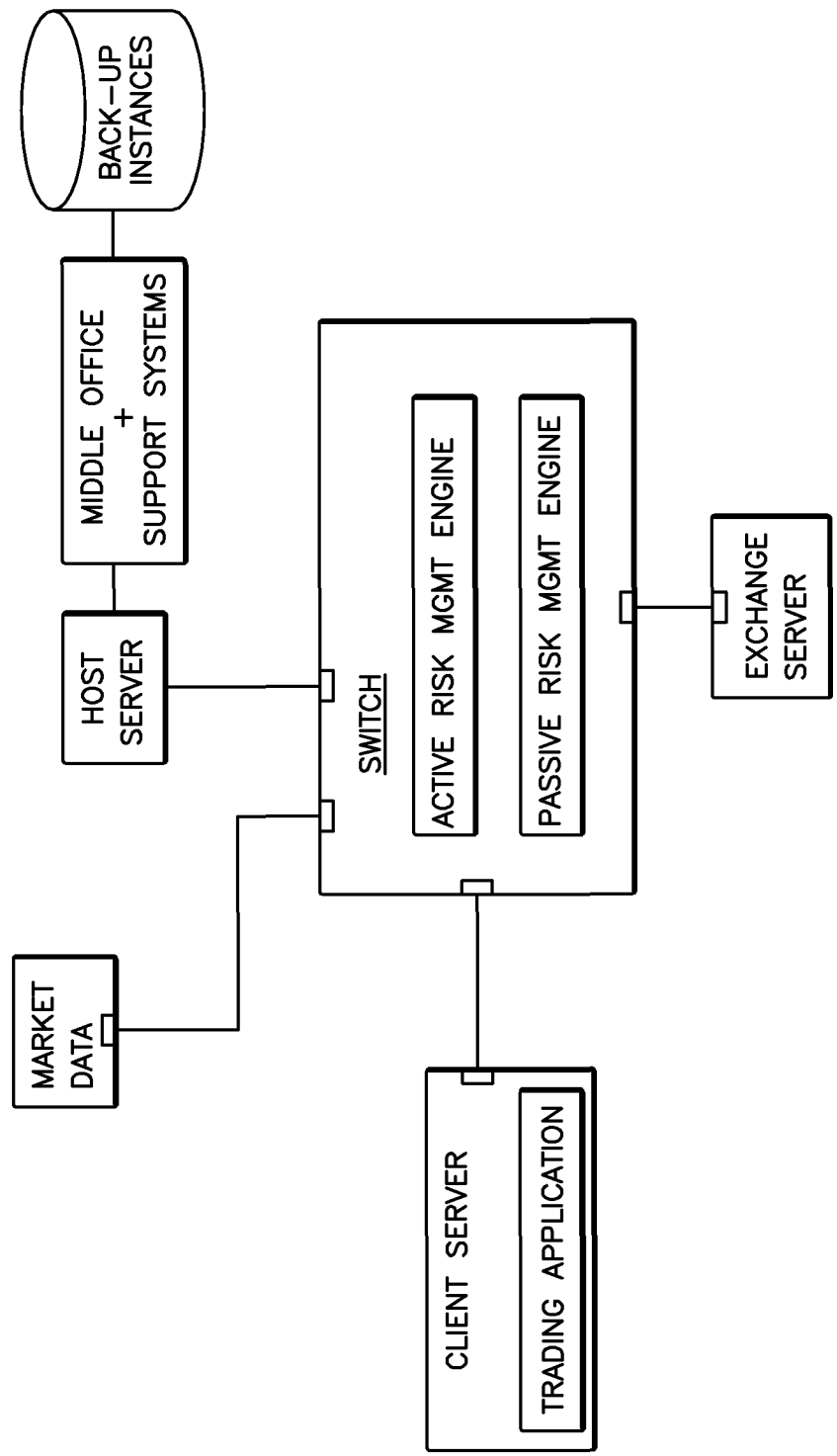
FIG. 10 is a schematic of certain components in another alternate embodiment of the present invention, in which active and passive risk checks are performed on a network device.

One such embodiment is shown in FIG. 10. As illustrated, the client server is separated from the exchange server by virtue of a switch. In this embodiment, the active risks checks and passive risk checks are performed on the switch, for example on an NPU. Again, as with the prior embodiments, latency is reduced by virtue of the active risk management checks being performed at the network layer.

It should be understood that the foregoing are merely illustrative embodiments and then various modifications may be made while staying within the scope of the present invention. For example, in certain embodiments, the device or inspection node performing any of the risk checks may also include a risk bypass detector. In this regard, in the embodiment of FIG. 2, the host server 10 may further include a risk bypass detector module in addition to or as part of the passive risk check module 90. In such an embodiment, the risk bypass detector compares trading activity that has been evaluated by the risk modules (a summary of which is generated locally) against a summary of activity that has actually occurred at the exchange (received from the exchange). If the risk bypass detector detects trading activity that has not been routed through the risk check components or modules, then the risk bypass detector produces a notification to disable the trading session and/or generates an alert calling for the employees of the host (broker-dealer) to contact the exchange.

While there have been shown and described various features of illustrative embodiments, it will be understood that omissions and substitutions and changes in the form and details of the disclosed embodiments of the invention may be made by those skilled in the art without departing from the spirit of the invention. In this regard, it should be understood that the embodiments are merely illustrative, and that the various features and implementations may be combined, interchanged and/or modified.

I claim:

1. An integrated circuit comprising:
   a plurality of communication ports including a first port and a second port;
   a memory; and
   digital logic programmed to:
      receive, by way of the first port, a first packet,
      extract payload data from the first packet, wherein a plurality of fields in the payload data define a request,
      parse the plurality of fields, in parallel, to determine that the request passes a first set of validity checks, wherein determining that the request passes the first set of validity checks involves comparing a field in the plurality of fields to a value stored in the memory and concluding that the request passes a first pre-defined check, based on the request passing the first set of validity checks, transmit a second packet encapsulating the payload data by way of the second port, and provide, to a processor, the payload data, wherein reception of the payload data causes the processor to execute instructions that perform a second set of validity checks, wherein the second set of validity checks involve determining whether the plurality of fields indicate that the request passes a second pre-defined check.

2. The integrated circuit of claim 1, wherein determining that the request passes the first set of validity checks further involves:

determining, from the plurality of fields, that: (i) an item involved in the request is not prohibited, and (ii) a number of items in the request is less than a threshold quantity.

3. The integrated circuit of claim 2, wherein performing the first set of validity checks comprises:

looking up the item in a table that correlates items to respective values, wherein the table is stored in the memory.

4. The integrated circuit of claim 1, wherein the first packet is received from a client device, and wherein determining whether the plurality of fields indicate that the request passes the second pre-defined check comprises:

determining whether the plurality of fields, considered in combination with client-specific constraints associated with the client device, indicate that the request is associated with a pre-defined risk.

5. The integrated circuit of claim 1, wherein the processor is configured to perform the second set of validity checks in software.

6. The integrated circuit of claim 5, wherein the software is configured to perform the second set of validity checks in a serial fashion.

7. The integrated circuit of claim 1, wherein the second packet is identical to the first packet.

8. The integrated circuit of claim 1, wherein the first port and the second port are each associated with respective physical layer hardware, media access layer digital logic, and TCP/IP digital logic, wherein the TCP/IP digital logic of the first port extracts the payload data from the first packet, and wherein the TCP/IP digital logic of the second port encapsulates the payload data in the second packet and transmits the second packet.

9. The integrated circuit of claim 1, wherein the first port and the second port each comprise respective Ethernet physical layer hardware and media access layer digital logic.

10. The integrated circuit of claim 9, further comprising:

a third port of the plurality of communication ports, wherein the third port communicatively connects the integrated circuit to the processor, and wherein the third port comprises a Peripheral Connection Component Interconnect Express (PCI-E) interface.

11. The integrated circuit of claim 9, further comprising:

a third port of the plurality of communication ports, wherein the third port communicatively connects the integrated circuit to the processor, and wherein the third port comprises Ethernet physical layer hardware and Ethernet media access layer digital logic.

12. The integrated circuit of claim 9, wherein the second packet contains unmodified TCP/IP headers of the first packet.

13. The integrated circuit of claim 1, wherein the digital logic is further programmed to:

extract TCP/IP header data from the first packet, wherein the request is defined by at least one field in the TCP/IP header data and the plurality of fields in the payload data.

14. The integrated circuit of claim 1, further comprising:

a multi-channel random access memory (RAM) with per-byte addressing;

a write controller configured to read the payload data from the first port into the multi-channel RAM; and a message delimiter state machine configured to detect the plurality of fields from the payload data stored in the multi-channel RAM.

15. The integrated circuit of claim 1, wherein the field is associated with a starting byte offset and an ending byte offset, wherein the digital logic includes field extractor digital logic programmed to obtain the field based on the starting byte offset and ending byte offset.

16. The integrated circuit of claim 1, wherein the field is associated with a starting byte offset and an ending byte offset, wherein the digital logic includes field extractor digital logic programmed to identify the starting byte offset and the ending byte offset based on starting and ending delimiters.

17. The integrated circuit of claim 1, wherein the digital logic is further programmed to:

receive, by way of the first port, a third packet, extract second payload data from the third packet, wherein a second plurality of fields in the second payload data defines a second request, parse the second plurality of fields, in parallel, to determine that the second request fails to pass the first set of validity checks, wherein determining that the second request fails to pass the first set of validity checks involves comparing a second field in the second plurality of fields to a second value stored in the memory and concluding that the second request contains a pre-defined validity violation, and based on the second request failing to pass the first set of validity checks, modify the second payload data to represent a null or erroneous request, and transmit, by way of the second port, a fourth packet encapsulating the second payload data.

18. A method performed by a system including an integrated circuit and a processor, the method comprising:

receiving, by way of a first port of the integrated circuit, a first packet;

extracting, by the integrated circuit, payload data from the first packet, wherein a plurality of fields in the payload data define a request;

parsing, by the integrated circuit, the plurality of fields, in parallel, to determine that the request passes a first set of validity checks, wherein determining that the request passes the first set of validity checks involves comparing a field in the plurality of fields to a value stored in a memory of the integrated circuit and concluding that the request passes a first pre-defined check;

based on the request passing the first set of validity checks, transmitting, by way of a second port of the integrated circuit, a second packet encapsulating the payload data; and providing, to the processor, the payload data, wherein reception of the payload data causes the processor to execute instructions that perform a second set of validity checks, wherein the second set of validity checks involve determining whether the plurality of fields indicate that the request passes a second pre-defined check.

19. The method of claim 18, further comprising:
extracting TCP/IP header data from the first packet, wherein the request is defined by at least one field in the TCP/IP header data and the plurality of fields in the payload data.

20. The method of claim 18, wherein the field is associated with a starting byte offset and an ending byte offset, the method further comprising:
identifying the starting byte offset and the ending byte offset of the field based on starting and ending delimiters.

* * * * *